United States Patent [19]
Murata et al.

[11] Patent Number: 4,977,448
[45] Date of Patent: Dec. 11, 1990

[54] COLOR IMAGE PROCESSING APPARATUS HAVING EXACT COLOR REPRODUCTION CAPABILITY

[75] Inventors: Kazuyuki Murata, Katano; Kinya Kanno, Neyagawa; Katsuhiro Kanamori, Kawasaki, all of Japan

[73] Assignee: Matsushita Electric Industrial Co., Ltd., Osaka, Japan

[21] Appl. No.: 285,525

[22] Filed: Dec. 16, 1988

[51] Int. Cl.$^5$ .............................................. H04N 1/46
[52] U.S. Cl. ........................................ 358/75; 358/80
[58] Field of Search ................. 358/75, 75 IJ, 78, 79, 358/80

[56] References Cited

U.S. PATENT DOCUMENTS

| | | |
|---|---|---|
| 4,271,436 | 6/1981 | Kurose et al. |
| 4,679,074 | 7/1987 | Sugiura et al. ......................... 358/75 |
| 4,739,397 | 4/1988 | Hayashi ................................. 358/78 |
| 4,745,466 | 5/1988 | Yoshida et al. ....................... 358/75 |
| 4,833,532 | 5/1989 | Abe ....................................... 358/80 |

FOREIGN PATENT DOCUMENTS

2917485 C2  9/1983  Fed. Rep. of Germany.
59-161979    9/1984  Japan.
2131001A    12/1984  United Kingdom.

Primary Examiner—James J. Groody
Assistant Examiner—Mark R. Powell
Attorney, Agent, or Firm—Wenderoth, Lind & Ponack

[57] ABSTRACT

An image processing apparatus is for exactly reproducing color originals. The apparatus includes a circuit for removing a ground color contained in an input color signal by forcibly changing an input signal having a level larger than a predetermined level to white. The apparatus may include a gamma correction circuit having therein a plurality of selectable gamma collection data. The apparatus may also include a circuit for producing a natural monochromatic signal from signals corresponding to three primary color signals R, G and B by performing an operation expressed as [(signal corresponding to R)$\times 2^I$+(signal corresponding to G)$\times 2^J$+(signal corresponding to B)$\times 2^K$]/$2^L$ wherein I, J, K and L are integers and $2^I+2^J+2^K=2^L$.

10 Claims, 5 Drawing Sheets

COLOR IMAGE PROCESSING APPARATUS HAVING EXACT COLOR REPRODUCTION CAPABILITY

BACKGROUND OF THE INVENTION

1. Field of the Invention

The present invention relates to a color image processing apparatus which digitally processes a color image.

2. Description of the Prior Art

Recently, the color image processing apparatus, such as a digital color copying machine and the like, has been demanded to perform the process for making the image as excellent as possible and to be equipped with a multi-functional performance.

A gradation correction performed in the conventional digital color copying machine, called a γ correction, is used for correcting gradations of digital signals which are outputted from an image scanner for reading out an original and which are corresponding to three primary colors respectively (the magnitude of each of the digital signals is proportional to the light quantity of a corresponding primary color) to match the gradation characteristic of a printer (Japanese patent publication No. 59-161979).

Since the conventional digital color copying machine has the output gradation characteristic of the printer corrected directly by a conversion of color-separated signals from the image scanner, if a distortion of the output gradation characteristic of the printer becomes larger, the limited number of bits for quantizing the color-separated signals in the image reading unit results in a situation in which the distortion correction of the output gradation characteristic of the printer causes quantization steps to be more coarse. Thus, even if the color correction (MASKING) processing is performed, the exact color reproduction is impossible.

If the ground of the original copy is colored, the conventional digital color copying machine cannot reproduce the color of the ground to be white and the colors of an image other than the ground to be exactly as they are.

When setting the copying machine to a monochromatic copying mode, gray components are extracted from a plurality of color image signals, so that the image obtained by the monochromatic copying of the colored original becomes unnatural.

SUMMARY OF THE INVENTION

An object of the present invention is to provide a color image processing apparatus for performing exact color reproduction of an original by converting the color image signal which is proportional to the quantity of light into a data which is linear in a density scale, i.e. which is visually linear, performing a color correction (MASKING) processing of such data, and thereafter correcting the output gradation characteristic of the printer just prior to an execution of pseudo half tone processing (dither processing and the like).

Another object of the present invention is to provide a color image processing apparatus with multifunctional performances capable of performing a tone adjustment, a ground-color removal, and a contrast adjustment, when converting the color image signal which is proportional to the quantity of light into a data which is linear in the density scale.

Still another object of the present invention is to provide a color image processing apparatus capable of generating a monochromatic image signal which is visually natural from a plurality of color image signals.

A color image processing apparatus in an embodiment according to the present invention is equipped with a density conversion circuit for converting an input signal into a density signal, a masking circuit for performing color correction, and a selector for selecting one signal out of a plurality of outputs from the masking circuit. The density conversion circuit is equipped with a plurality of memories having stored therein data for performing a density conversion of a plurality of color image data including an ground-color removal of the input data. The density conversion circuit is further equipped with means for making a level of the ground-color removal variable, independently for each color.

Furthermore, a color image processing apparatus in another embodiment according to the present invention is equipped with a density conversion circuit for converting an input signal into a density signal, a masking circuit for performing a color correction of a color image data using a plurality of color image data, a binary circuit for performing a pseudo half tone processing of multivalued image signals, and a gamma (γ) correction circuit for performing a correction of the gradation characteristic of the printer. The gamma correction circuit is connected between the masking circuit and the binary circuit, and located just before the binary circuit. The gamma correction circuit comprises a memory into which correction data are stored, and means for selecting one of the correction data.

Still further, a color image processing apparatus in still another embodiment according to the present invention is equipped with a density conversion circuit for converting an input signal into a density signal, a masking circuit for performing a color correction, a density detecting circuit for generating one color signal out of a plurality of image signals issued from the density conversion circuit, a selector for selecting one signal from a plurality of outputs from the masking circuit and from the output of the density detecting circuit, a binary circuit for transforming value of the image signal into a binary value, and a printer. A plurality of image signals from the density conversion circuit correspond to the three primary colors, R, G, B, respectively. The density detecting circuit is equipped with means for operating a formula, [(signal corresponding to R)$\times 2^I$+(signal corresponding to G)$\times 2^J$+(signal corresponding to B)$\times 2^K$]/$2^L$, wherein I, J, K, L are intergergers which meet the requirement of $2^I+2^J+2^K=2^L$ More simply, the formula may be [(signal corresponding to R) +2$\times$(signal corresponding to G)+(signal corresponding to B)]/4.

The density detecting circuit may be equipped with a memory into which data for converting a plurality of color image signals into one image signal are stored.

Such a construction as above,, enables output of a natural image, which is fit to the characteristics of the human visual sensitivity, when generating a monochromatic signal from a plurality of color signals.

In addition, the present invention can process image signals with an influence of the number of steps for quantizing the input image signals being minimized by means of performing the gamma correction of the printer and select the correction data for the output gradation characteristic of the printer under various kinds of conditions.

Even in the case where the ground of an original which has been read out by an image scanner and the like is colored, the present invention can cause the ground-color to be white by the ground-color removable function of the density conversion circuit which allows the image signal data, to become 0.

The above and other objects, features and advantages of the present invention will be apparent from the following description taken in connection with the accompanying drawings, in which:

DESCRIPTION OF THE PREFERRED EMBODIMENTS

Figure 1:
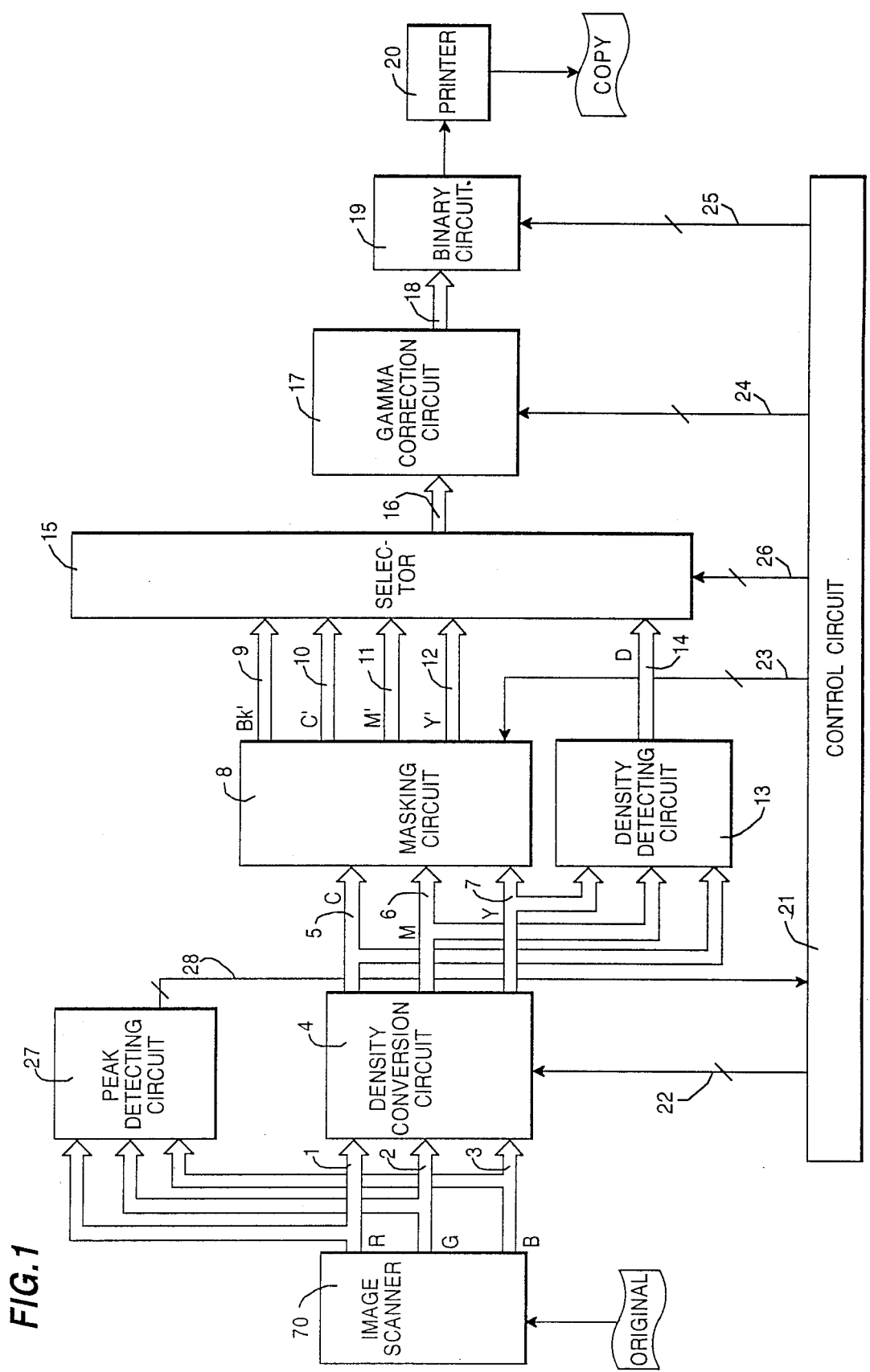
FIG. 1 is a block diagram illustrating a digital color copying machine in an embodiment according to the present invention.

A description of the color image processing apparatus according to the present invention is made in conjunction with the drawings as follows:

FIG. 1 is a block diagram of a digital color copying machine embodying a color image processing apparatus according to the present invention. Signal 1 denotes a red color signal R which is outputted from an image scanner 70, 2 denotes a green color signal G, and 3 denotes a blue color signal B. The color signals 1, 2, 3 are converted into density data by a density conversion circuit 4 which outputs a signal 5 corresponding to cyan (C), a signal 6 corresponding to magenta (M), and a signal 7 corresponding to yellow (Y). A control circuit 21, which is a circuit for selecting and setting various kinds of modes of the copying machine, comprises a microcomputer with I/O ports. A peak detecting circuit 27 detects and outputs a peak value 28 of the R.G.B signals in each line during a pre-scanning.

The scanner 70 pre-scanns the original, and during such pre-scanning the control circuit 21 repeated by sample of the output of the peak detecting circuit 27, to obtain a histogram of the peak values, and determines the ground level of each of R, G, B of the original from the histogram. At this time the color of a original cover of the scanner is black. A signal 22 from the control circuit 21 causes the density conversion circuit 4 to change over its mode.

The output signals 5, 6, 7 from the density conversion circuit 4 enter into a masking circuit 8, which performs a ground-color removal, an extraction of the black component, and a masking for correcting turbidness in ink in a printer 20. The masking circuit 8 outputs color signals including a black (Bk') signal 9, a cyan (C') signal 10, a magenta (M') signal 11 and an yellow (Y') signal 12. A signal 23 from the control circuit 21 causes the masking circuit 8 to change over its mode.

The signals 5, 6, 7 are inputted also into a density detecting circuit 13, which generates one monochromatic signal (D) 14 from the three color signals 5, 6, 7. A selector 15 selects one signal from signals 9, 10, 11, 12 and 14, and outputs it as a signal 16. In the case of making an output to the printer in a form of four color lapping, the selector 15 sequentially selects the signals 9, 10, 11 and 12. The selector 15 selects signal 14 in a monochromatic printing mode. Such selections are determined by a signal 26 from the control circuit 21. A gamma ($\gamma$) correction circuit 17 for correcting the output gradation characteristic of the printer 20 outputs a signal 18. A signal 24 from the control circuit 21 controls the gamma correction circuit 17. A binary circuit 19 for performing a pseudo half tone processing of the signal 18 outputs a signal which has been transformed into a binary value to the printer 20. A signal 25 from the control circuit 21 causes the binary circuit 19 to select a mode of the pseudo half tone processing. The printer 20 performs consecutively the printing process using black, cyan, yellow and magenta inks to obtain a copy.

Figure 2:
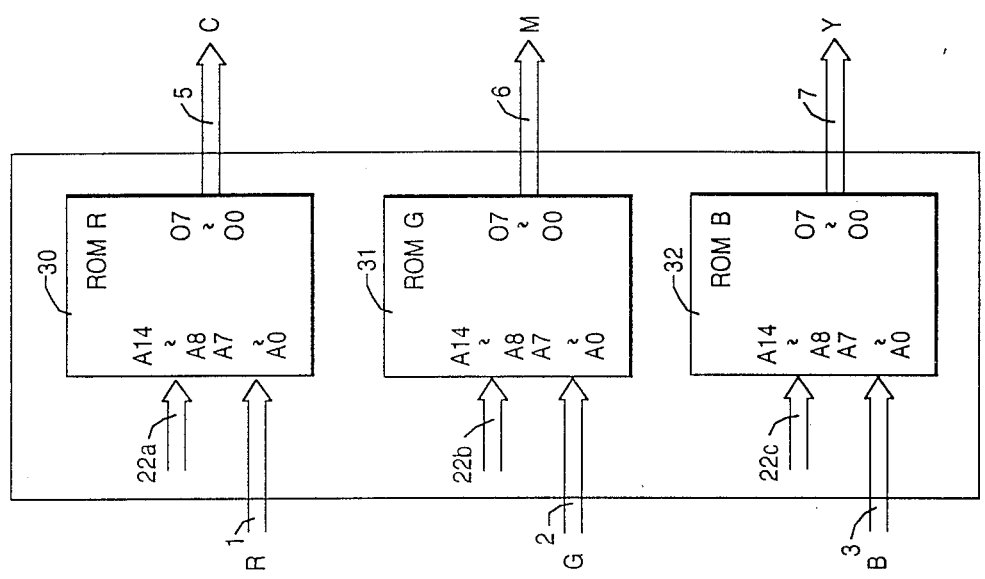
FIG. 2 is a block diagram of the density conversion circuit shown in FIG. 1.

The density conversion circuit 4 will be described with reference to FIG. 2. FIG. 2 is a block diagram of the density conversion circuit 4. The color signals (R) 1, (G) 2 and (B) 3, each being an 8-bit data, are supplied from the image scanner 70. Signals 22a, 22b and 22c are components of the signal 22 issued from the control circuit 21, and each of them is a 7-bit data. Signals 1, 22a, signals 2, 22b and signals 3, 22c are respectively applied to address inputs of ROMs 30, 31 and 32. The ROMs 30, 31 and 32 output the signals 5, 6 and 7 respectively which are the data being read out by the ROMs 30, 31, 32. Signals 22a, 22b, 22c determine which one of the conversion table data of the ROMs 30, 31, 32 is to be selected.

Figure 3:
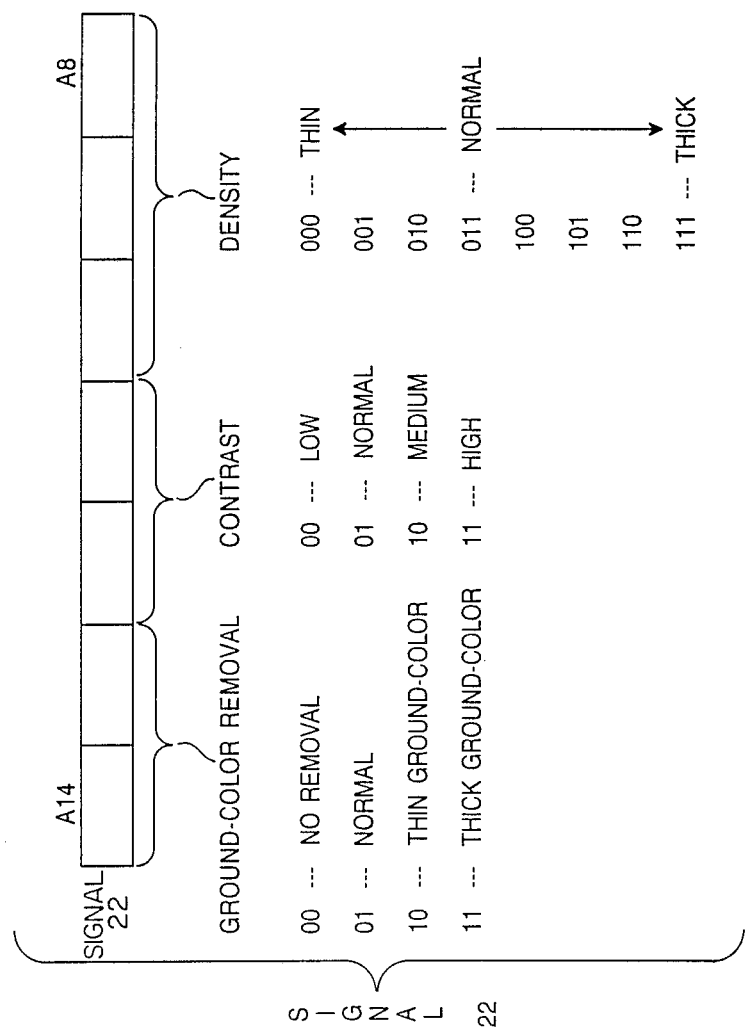
FIG. 3 is an illustration representing each bit function of the signal 22 from the control circuit 21 shown in FIG. 1.

Next, a description of content, of the data of the ROMs shown in FIG. 2 will be made with reference to FIGS. 3 and 4(a)-(b). FIG. 3 is an illustration representing the function of each bit of each of the signals 22a, 22b, 22c issued from the control circuit 21. The lower 3 bits control variably the density, the following 2 bits perform the contrast adjustment, and the upper 2 bits set the level of the ground-color removal.

Figure 4A:
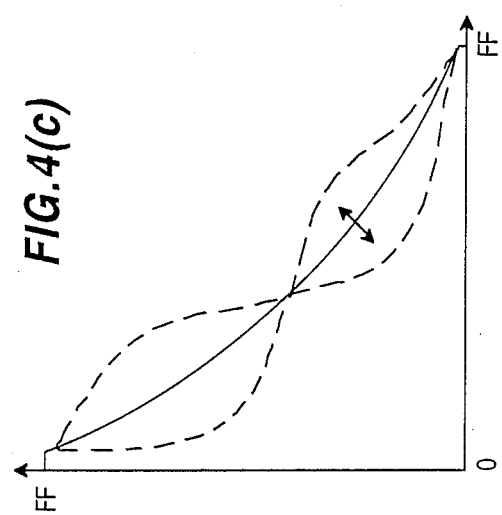
FIGS. 4(a)-(c) are illustrations respectively representing contents of table data of ROMs 30, 31, 32 shown in FIG. 2.
Figure 4B:
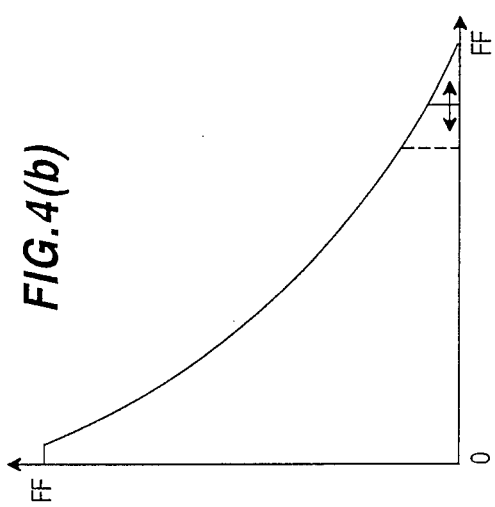
Figure 4C:
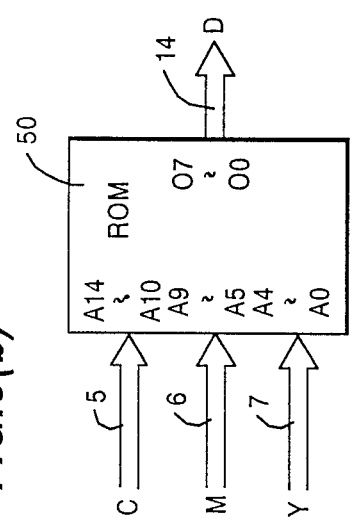

FIG. 4 is an illustration representing the content of the table data of the ROMs 30, 31, 32. Transverse axes represent the color signals being inputted into the addresses A0-A7 of the ROMs, in which 'FF'H stands for maximum brightness. Ordinate axes represent the output data from the ROMs, in which 'FF'H stands for maximum density. As shown by a solid line in FIG. 4(a), the basic conversion function of the ROMs 30-32 aims at conversion to the density As shown by a broken line in FIG.4 (a), a parallel movement of the conversion table data in a vertical direction allows 8 sets of table data (000-111) to be made. Setting the lower 3 bits as shown in FIG. 3 permits one of 8 sets of density conversion table data to be selected. FIG. 4(b) is an illustration representing the table data having the ground-color removal function. As shown in FIG. 4(b), the aforementioned table data is to output 0 when the value of the input data is larger than predetermined fixed value. Therefore, even in the case where the ground-color of the original which the scanner reads out is colored, forcing the density of the data whose value is larger than the predetermined fixed value to be changed into 0 enables the output to become 0. One of 4 sets of table data (00-11) for changing the ground-color removal level is selected by the upper 2 bits as shown in FIG. 3. FIG. 4(c) is an illustration representing the table data which perform the contrast adjustment. As shown by the broken line in FIG. 4(c), changing of an inclination of the table data belonging to a medium density area permits contrast characteristics to be changed. Anyone of 4 sets of table data (00-11) is selected by the middle 2 bits as shown in FIG. 3.

Thus, 128 (obtained by 8 for the density adjustment×4 for the ground-color removal level ×4 for the contrast adjustment) different selections of the table data are possible. Since such a selection can be made independently for each of the ROMs 30, 31, 32, even if the ground is not gray but colored the ground-color removal is possible. At the same time, the contrast adjustment can be carried out for each color, and the density adjustment can be performed for each of the R, G, B colors to effect the tone adjustment.

Figure 5:
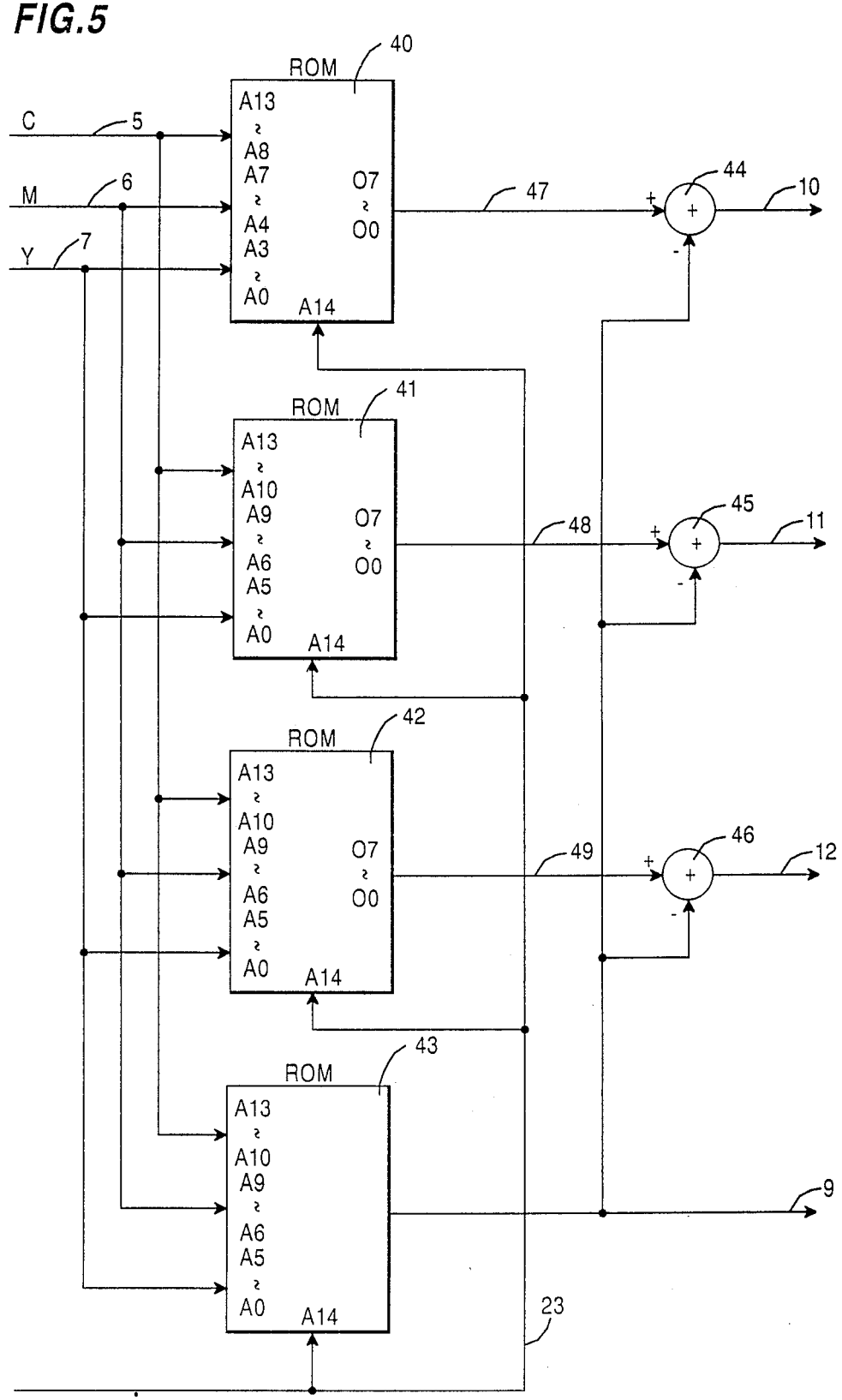
FIG. 5 is a block diagram of the masking circuit 8 shown in FIG. 1.

A description of the masking circuit 8 will be made with reference to FIG. 5. FIG. 5 is a block diagram of the masking circuit 8. ROMs 40, 41 and 42 have stored therein table data for performing the masking, while a ROM 43 has stored therein table data for extracting the black component. As shown in FIG. 5, the outputs 5, 6 and 7 from the density conversion circuit enter into the address input of each of the ROMs 40-43. Masking table data for performing the color adjustment of the output from the printer are stored in the table data of the ROMs 40-42. The addresses A14 of the ROMs 40-43 are used for selection of the table data of the masking and the black generation, and such selection is made by the signal 23 from the control circuit 21. In the case of changing a method of the pseudo half tone processing which will be described later, a selection of masking table data and black generating table data which are suitable for such processing is made. The ROMs 40, 41, 42 and 43 output signals 47, 48, 49 and 9 respectively. Subtractors 44-46 perform subtractions of the output 9 of the ROM 43 from the outputs 47, 48, 49 from the ROMs 40-42, respectively, to obtain the 10, 11, 12.

Figure 6A:
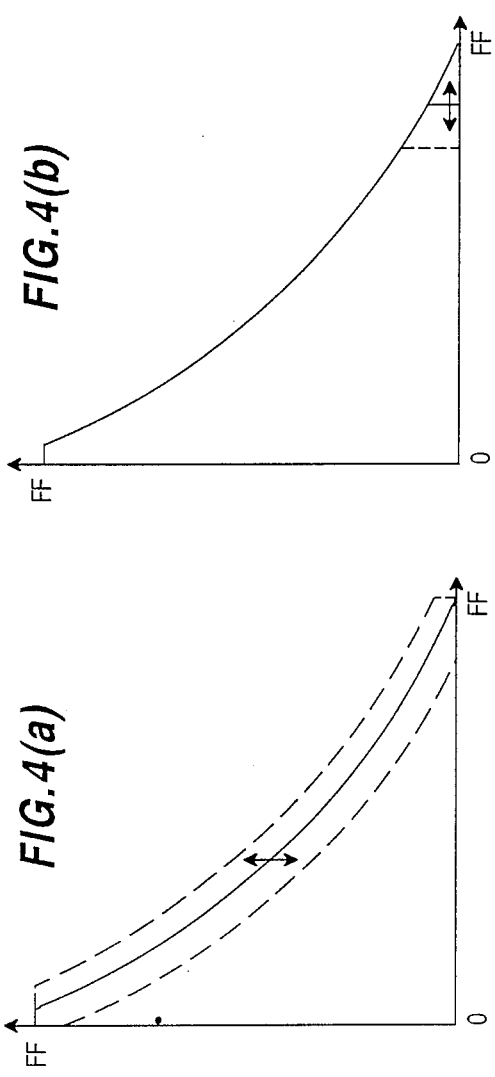
FIGS. 6(a)-(b) are block diagrams of the density detection circuit 13 in FIG. 1.

FIG. 6(a) is a block diagram of an example of the density detecting circuit 13. Blocks 51 and 52 are 8-bit full adders. Each of 8-bit signals (C) 5 and (Y) 7 from the density conversion circuit 4 is inputted into the adder 51. Upper 8 bits including a carry from the full adder 51 and 8-bit signal (M) 6 are inputted into the full adder 52, and the monochrome, upper 8 bits including a carry from the full adder 52, is outputted as the signal 14. Namely, the density detecting circuit 13 performs an operation, $(C+2M+Y)/4$. Correspondingly to the fact that a peak location of the human visual spectral sensitivity lies in green, the density detecting circuit 13 performs the operation in which a weight twice as large as those of the other two colors C, Y is applied to the signal M corresponding to the green, whereby a simple circuit generates the density signal possibly near to the human spectral sensitivity.

Figure 6B:
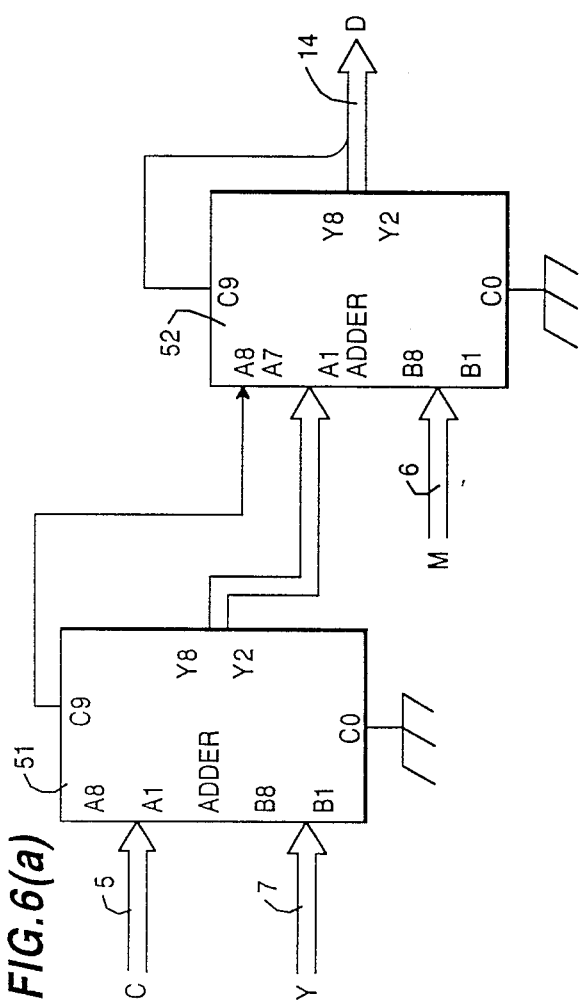

FIG. 6(b) is a block diagram of another example of the density detecting circuit 13. Block 50 is a ROM which, receiving the signals 5 for (C), 6 for (M), 7 for (Y) from the density conversion circuit 4 as the address input, and outputs the monochromatic signal 14. The output being memorized by the ROM 50 is the data for performing, for example, such an operation as $(C+3.2\times0.9\times Y)/5.1$. The data can be generally expressed as $(2^I\times C+2^J\times M+2^K\times Y)/2^L$ where I, J, K and L are integers satisfying $2^I+2^J+2^K=2^L$. Considering the characteristics of human visual spectral sensitivity and the spectral characteristics of color separation by the image scanner, the multiplication coefficients of C, M and Y and the divisor of the formula may be optimized.

Figure 7:
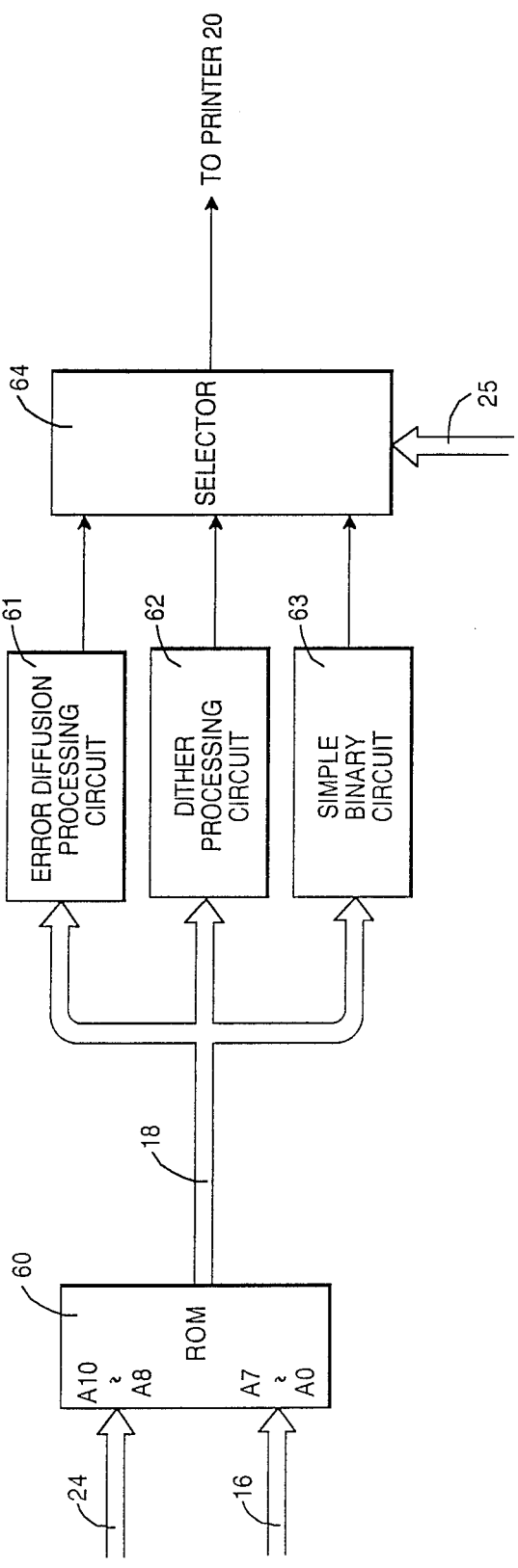
FIG. 7 is a block diagram of the gamma correction circuit and the binary circuit shown in FIG. 1.

A description of the gamma correction circuit 17 and the binary circuit 19 will be made with reference to FIG. 7 is a block diagram of the printer gamma correction circuit 17 and the binary circuit 19. A ROM 60 has stored therein table data for the $\gamma$ correction of the printer. The signal 16 is the output signal from the selector 15, and the signal 24 is the signal for selecting the ROM table data from the control circuit 21. As shown in FIG. 7, the signals 16 and 24 enter into the address input of the ROM 60. The output signal 18 from ROM 60 is fed to an error diffusion processing circuit 61, a dither processing circuit 62, and a simple binary circuit 63. The signal 25 from the control circuit 21 causes a selector 64 to select any of the output signals from the circuits 61, 62 and 63 to obtain an output to the printer 20.

Figure 8:
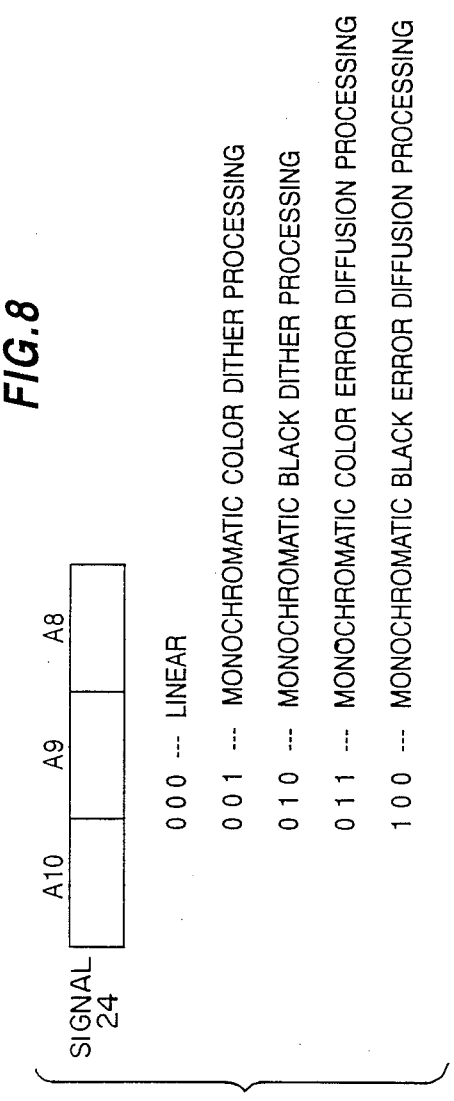
FIG. 8 is an illustration of bits of the signal 24 for selecting the table data of ROM 60.

The signal 24 from the control circuit 21, 3 bits in width, is determined by the signal to be selected by the selector and a printing mode of the printer. FIG. 8 represents a relation between bits of the signal 24 and the selected table data for $\gamma$ correction of the printer in the ROM 60. When any of the signals 9-12 shown in FIG. 1 is selected by the selector 15 or the output from the simple binary circuit 63 is selected by the selector 64, the table data for $\gamma$ correction of the printer selects "linear" which means a table data that does not perform the $\gamma$ correction, because the masking processing has already permitted the $\gamma$ correction of the printer to be executed. As shown in FIG. 7, a selection of the table data for Y correction of the printer is made according to how many colors are printed out under a monochromatic copying mode and which of the output signals from the binary processing circuit is selected to be outputted to the printer.

In the case where only one method of binary processing is used, or where the $\gamma$ correction of the monochromatic signal is not needed, the gamma correction circuit may be omitted.

What is claimed is:

1. A color image processing apparatus comprising:
   density conversion means for performing a conversion of densities of a plurality of input color signals, including a ground color removal means for forcing a color signal in the plurality of input color signals having a level more than a predetermined level into a signal corresponding to white, to obtain a plurality of density signals;
   masking means for performing a color correction of the plurality of density signals to obtain a a plurality of color-corrected signals; and
   selecting means for selecting one signal from the plurality of color-corrected signals.

2. An apparatus as recited in claim 1, said density conversion means including varying means for making the predetermined level of the ground color removal function variable in response to a signal level of a ground color of an original.

3. A color image processing apparatus as recited in claim 2, said varying means being independently provided for each of the plurality of input color signals.

4. A color image processing apparatus as recited in claim 1, said density conversion means including a plurality of memories each having stored therein density signals in the form of a look-up table.

5. A color image processing apparatus comprising:
density conversion means for performing a conversion of densities of a plurality of input color signals to obtain a plurality of density signals;
masking means for performing a color correction of the plurality of density signals to obtain a plurality of color-corrected signals;
selecting means for selecting one signal from the plurality of color-corrected signals;
gamma correction means for correcting an output gradation characteristic of a printer, said gamma correction means having means for selecting one of a plurality of gradation characteristic correction data; and,
binary means for applying a pseudo half tone processing to an output signal of said gamma correction means;
said printer for printing an image according to an output signal of said binary means.

6. A color image processing apparatus as recited in claim 5, said binary means comprising a plurality of binary processing means for performing different binary processing operations, and means for selecting one of the plurality of binary processing means.

7. A color image processing apparatus comprising:
density conversion means for performing a conversion of densities of a plurality of input color signals to obtain a plurality of density signals corresponding to three primary colors R, G and B, respectively;
masking means for performing a color correction of the plurality of density signals to obtain a plurality of color-corrected signals;
density detecting means for generating a monochromatic signal from the plurality of density signals by performing an operation expressed as {(signal corresponding to R)$\times 2^I$ $\times$(signal corresponding to G)$\times 2^J \times$(signal corresponding to B)$\times 2^K$}/$2^L$, where I, J, K and L are integers, and where $2^I + 2^J + 2^K = 2^L$;
selecting means for selecting one signal from the plurality of color-corrected signals and the monochromatic signal;
binary means for transforming an output signal of said selecting means to binary values; and,
a printer for printing an image according to the binary values from said binary means.

8. A color image processing apparatus as recited in claim 7, wherein said density detecting means includes means for performing the following operation: {[[(signal corresponding to R)+2$\times$(signal corresponding to G)$\times$(signal corresponding to B)[]]}/4.

9. A color image processing apparatus as defined in claim 5, wherein said gamma correction means includes a memory having stored therein the plurality of gradation characteristic correction data.

10. A color image processing apparatus comprising:
density conversion means for performing a conversion of densities of a plurality of input color signals to obtain a plurality of density signals;
masking means for performing a color correction of the plurality of density signals to obtain a plurality of color-corrected signals;
density detecting means for generating a monochromatic signal from the plurality of density signals, said density detecting means comprising a memory having stored therein data corresponding to a plurality of monochromatic signals and receiving the plurality of density signals as an address input thereof for outputting one of the stored data;
selecting means for selecting one signal from the plurality of color-corrected signals and the monochromatic signal;
binary means for transforming an output signal of said selecting means to binary values; and
a printer for printing an image according to the binary values from said binary means.

* * * * *